United States Patent [19]

Bertram

[11] Patent Number: 5,268,392
[45] Date of Patent: Dec. 7, 1993

[54] DETERIORATED STRUCTURE REPAIR METHOD AND SUBSTRATUM FOR RESTORING AND LINING CORRODED STRUCTURE

[76] Inventor: Richard L. Bertram, 8577 Wonderland Ave., Hollywood, Calif. 90046

[21] Appl. No.: 966,282

[22] Filed: Oct. 26, 1992

[51] Int. Cl.⁵ .............................................. C08G 18/14
[52] U.S. Cl. ...................................... 521/51; 521/53; 521/82; 521/99; 428/34.4; 428/34.7; 428/36.5; 428/159; 428/160; 428/308.4; 428/425.5; 427/136; 427/140; 427/207.1; 427/230; 427/273; 427/413
[58] Field of Search ....................... 521/51, 53, 82, 99; 428/34.4, 34.7, 36.5, 159, 160, 308.4, 425.5; 427/136, 140, 207.1, 230, 273, 413

[56] References Cited

U.S. PATENT DOCUMENTS 4,792,493 12/1988 Bertram et al. ..................... 428/911

Primary Examiner—Maurice J. Welsh
Attorney, Agent, or Firm—Thomas A. Turner, Jr.

[57] ABSTRACT

A concrete fluid structure deteriorated to the condition of removal of substance of the concrete by sulfuric acids and like corrosive material in contact therewith is restored by a substratum of epoxy foam, polyurethane foam, or a combination thereof having a relatively thin layer of polyvinyl chloride or polyethylene bonded to the outward facing surface of the foam and bonding the layer to the structure. A method for forming the substratum in the location of the deteriorated structure is described.

22 Claims, 2 Drawing Sheets

DETERIORATED STRUCTURE REPAIR METHOD AND SUBSTRATUM FOR RESTORING AND LINING CORRODED STRUCTURE

BACKGROUND OF THE INVENTION

1. Field of the Invention

The present invention relates to the art of restoring deteriorated concrete or metal structures to resist corrosion, and more particularly to the application of polymer substances to restore substratum removed by corrosive deterioration and lining the restoration to resist corrosion.

2. Description of the Prior Art

Waste water and sewerage are frequently conducted through fluid conduits made of concrete. In some applications, the conduits are made of metal. Sewer systems frequently have reservoirs, containers and ponds, such as settling ponds which also are made of concrete and sometimes of metal. Sewerage and waste water often contains highly corrosive material, especially with respect to concrete and metal. The closed system which constitutes most sewerage systems in use presently, creates anaerobic conditions ideal for the proliferation of anaerobic bacteria which result in hydrogen sulfide. Consequently, waste water pipes, sewage pipes, reservoirs, containers and ponds frequently are the subject of substantial corrosion and deterioration. In addition, corrosive material resulting from the digestive by-products of organisms existing within the waste water and sewer systems cause substantial deterioration of the concrete and metal conduits.

Here in this specification for simplicity of explanation, reference will often be made to "conduits," by which term I intend to include not only conduits and pipes, but also reservoirs, containers and ponds as discussed above. Such "conduits," as that term is used herein, includes, for example, settling or processing "ponds" at sewerage processing plants, back-up reservoirs and building structures involved with such processing, unless the text specifies otherwise.

The deterioration frequently takes the form of physical decay of the walls of the conduits so that the thickness of the walls is reduced. Actual amounts of the concrete or metal are literally removed or worn away over the years. In many instances, sewer and waste water conduits and like structures have walls so thin that the conduits have collapsed under the weight of traffic passing over them, and it has been reported that people have stuck their arms through them with relative ease.

Another undesirable effect of the corrosion and deterioration is that in the weakened condition that thin walls have, the walls crack more easily, resulting in leaks in the sewer system. Such leaks undermine the soil or prepared beds in which the concrete or metal pipes lay. Further, such leaks may contaminate the aquifer, may pollute the water ways and may surface to make the environment above unpleasant, as well.

Some of the more common corrosive materials within sewer conduits are sulfuric acid and hydrogen sulfide, which can turn into sulfuric acid under the conditions frequently found in sewer systems. Their corrosive effects may be readily appreciated. Sewer conduits normally have an anaerobic slime deposit along the wall of the conduit which is submerged below the liquid line or level. Various metal sulfates are among the more common ingredients of this anaerobic deposit. In the substantially liquid waste water, the sulfates reduce to sulfide ions, which combine with the hydrogen in the waste water to outgas above the liquid level as hydrogen sulfide, which can be highly corrosive to metals. Some sewer pipes are made of metal, and many more concrete pipes have metal, i.e. steel reinforcing ribs and like support structure. Oxygen condenses on the upper portions of the interior surface of the conduit wall which are not in contact with the liquid being conducted, and interacts with bacteria within the conduit above the liquid level. The bacteria produces more hydrogen sulfide. Oxygen from the liquid and condensing from the water in the air reacts with the hydrogen sulfide acid to create the highly corrosive sulfuric acid. The hydrogen of the acid reacts with the calcium hydroxide in the cement of the concrete conduit, and calcium results as gypsum or calcium sulfate, which has been described as a soft corrosion product. The gypsum drops off the interior of the wall itself, making the wall more thin and substantially weakened. In this manner, whole chunks of the concrete wall are removed or vanish, reducing the thickness of the wall.

Restoring such damaged and weakened conduits and pipes in the past has been accomplished primarily through two fundamental methods. In one basic modality, the concrete conduits are entered and fresh concrete is troweled onto the walls to build the thickness back to the original dimension. This method is somewhat problematic in that troweling on the roof of the conduit requires special efforts and time. Frequently, such as in sewer conduits, for example, the repair must be performed within a specified time window. Usually, sewer conduits have a relatively lower flow rate or level during the hours between midnight and the normal waking hours of around seven in the morning. After the normal waking hours, most sewer conduits are so full that entry into the conduit and any repair are not possible.

A second modality involves a process of digging from the top surface down to the weakened conduit. The earth around the weakened conduit is excavated, and a layer of concrete of suitable thickness is poured around the weakened conduit to, in effect, provide a new conduit encasing the old, crumbling sewer pipe. This method has special problems, as well. For example, most such pipes are underneath roadways and streets. Excavating down to the sewer pipe requires removing the surface road or street and diverting traffic often for weeks at a time. The amount of concrete required to encase the old pipe is substantial. The manpower required for excavating, concrete pouring and road and street restoration is substantial, as well. Both in time and material, such repair or restoration is expensive, and the disruption to street traffic is costly to the public.

Other modalities exist, such as for example a method called "slip lining," in which new pipe is inserted within the old, crumbling pipe to strengthen the pipe walls. Such methods reduce the diameter of the pipe or conduit and create problems with connecting lateral pipes joined to the pipe being repaired or restored.

Many of the methods used in the past result in a restored conduit which has a surface facing the effluent made of the same material that deteriorated before. This problem has been addressed by coating or lining the interior facing surfaces after restoration of the conduit, but such liners or coatings have met with only varying levels of satisfaction. Further, many of such methods result in a concrete or metal pipe in which the restoration is rigid or brittle. The brittleness of the restoration itself may soon result in further cracking from thermal cycling and normal as well as violent ground movement.

It has been known in the past to provide lining for the interior surfaces of such conduits and pipes. See, for example, my U.S. Pat. No. 4,792,493 issued to Vernie L. Belcher and myself. Such linings greatly enhance the ability of the conduit to resist the corrosive effects of the many acids caustics, toxins and organic material common in waste water and sewer systems. Lining, however, is appropriate only where the fundamental integrity of the conduit wall is substantially unimpaired, and its thickness is sufficiently strong enough to contain the substances being conducted through the pipe or conduit and sufficiently strong enough to support the earth and roadway systems above it. Where the integrity of the conduit wall is diminished, restoration of the concrete or metal structure of the conduit is necessary before a lining is applied.

It is desired to provide a method and structure for restoring the interior integrity of concrete and metal conduits and pipes having exposure to highly corrosive substances. It is desired, further, to provide such method and structure which, when applied, will have great resistance to such corrosive substances and will restore some strength to the repaired structure. It is a further desire to restore strength to the structure being restored while providing a measure of flexibility to the structure in order to resist cracking and consequent leaks. It is greatly desired and sought to provide such a method and structure which can be applied and cured or set within tight time windows available for such restoration.

SUMMARY

In brief, in accordance with one aspect of the present invention, a method for restoring concrete or metal conduits, pipes and like structures in described in which an epoxy resin or a polyurethane resin is hydrogenated and applied along with an isocyanate to create a foam which is spray applied onto the interior of walls deteriorated to the extent that substances of the walls have been removed leaving a weakened wall. The epoxy or urethane forms a substratum restoring the integrity of the wall. A surface of a relatively thin layer of polyvinyl chloride or polyethylene material is treated for bonding to either the epoxy or the urethane foam, and the relatively thin layer is then applied to the epoxy or urethane substratum.

A substratum comprising substantially the epoxy or urethane foam having a layer of polyvinyl chloride or polyethylene bonded on the outwardly facing surface of the substratum is described in which the bonded layer provides protection against the corrosive components formed within sewer systems.

Other novel features which are believed to be characteristic of the invention, both as to organization and methods of operation, together with further objects and advantages thereof, will be better understood from the following description in which preferred embodiments of the invention are described by way of example.

DESCRIPTION OF THE PREFERRED EMBODIMENT

Figure 1:
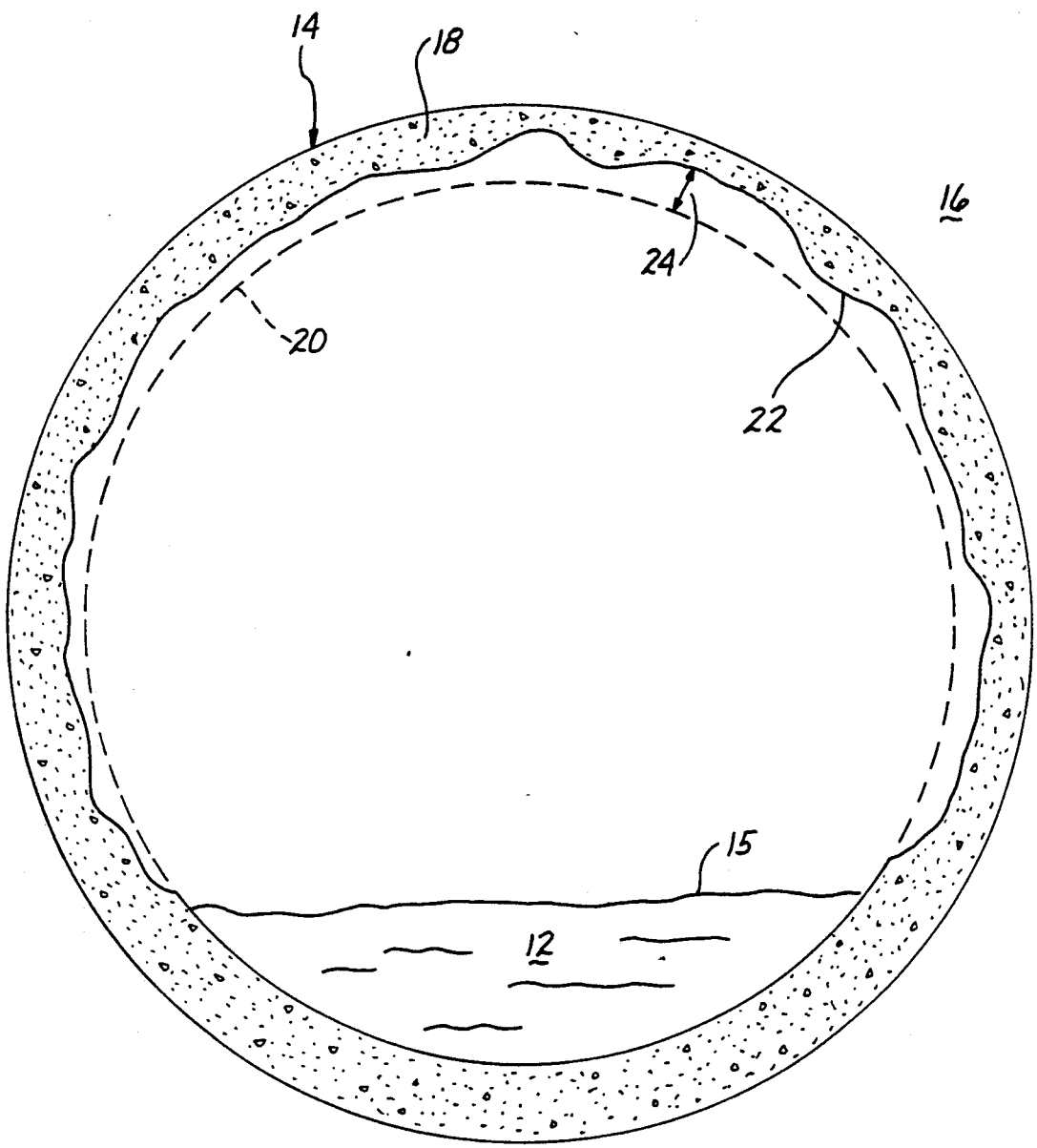
FIG. 1 is a cross-sectional elevation view of a fluid conduit within the ground showing the deterioration thereof.

Waste water 12 is conducted normally through a concrete sewer pipe 14 positioned underneath the ground 16, frequently beneath roadways and streets, reference being had initially to FIG. 1 of the accompanying drawings. The waste water 12 has a liquid level 15 which rises and falls during the cycle of use of the sewer system. Normally, the liquid level 15 is relatively low, as shown in the accompanying FIG. 1 during the hours of from midnight to 7:00 a.m. o'clock. The level rises sharply around 7:00 a.m. o'clock and stays relatively high during the day until late in the evening hours, many times filling up the pipe 14 almost to the top most level within the pipe, sometimes called the crown of the pipe or conduit 14.

As explained above, the wall 18 of the pipe 14 is corroded primarily in those portions which are not submerged during portions of the cycle of use. The broken line 20 represents the original interior surface of the wall 18 before deterioration removed substantial portions. The interior surface results after substantial portions 24 of the wall 18 are removed by the corrosion and deterioration to result in void spaces 24 within the pipe where concrete once existed.

Figure 2:
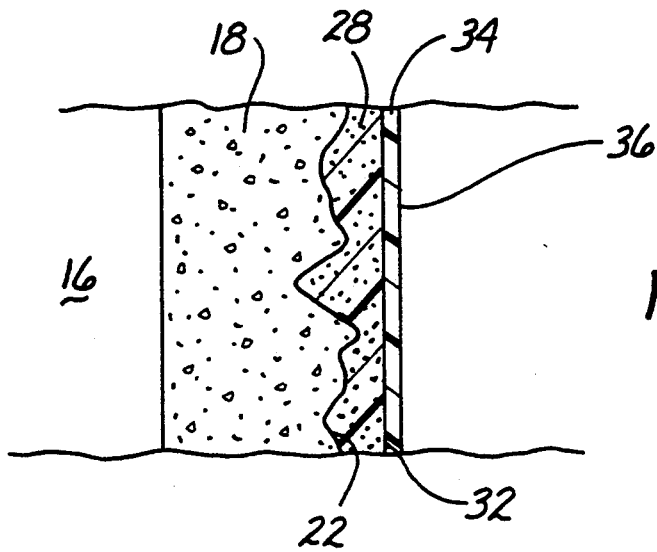
FIG. 2 is a cross-sectional view os a conduit within the ground showing the preferred embodiment of the present invention; and, FIG. 3 is a block diagram of the method of the preferred embodiment of the present invention showing the steps thereof.

The thickness of the wall 18 is built up in the preferred embodiment of the present invention by applying a foam substratum 28 to the surface 22 of the wall 18, referring to FIG. 2 of the accompanying drawings. In one embodiment, the foam is made from a polyurethane resin and an isocyanate. The polyurethane resin is hydrogenated with water to provide the foaming capability. The polyurethane resin contains a thixotropic amine in an amount sufficient to provide an adequate vertical hold. A suitable surfactant is added to control cell size and structure. It is believed that for optimum restoration, the cell structure should be comprised mostly of closed cells of small size.

Only so much water is used in order to result in a polyurethane foam having a density of at least ten pounds per cubic foot, but preferably in the range of from sixteen to fifty-five pounds per cubic foot. It is believed that this density provides a polyurethane foam which is sufficiently strong to restore the strength necessary for a good sewer pipe or conduit. Further, such density has a flexibility which maintains the integrity of the pipe and the restoration during thermal cycling and most ground movements. The precise amount of water is determined according to the strength desired in the conduit to be restored, and costs associated with the restoration.

The polyurethane foam can be formed on the inside, irregular surface which needs restoring by forcing the hydrogenated resin through one conduit, and the isocyanate through a second, concentric conduit in a flexible hose with appropriate heating, as explained in greater detail in U.S. Pat. No. 4,792,493, the methods and means therein set forth being incorporated herein in this application as though fully set forth at length. The urethane foam 28 forms a substratum 28, normally setting to a tacky consistency in one-half hour, leaving an interior facing surface 32.

An extruded thermoplastic liner layer 34 capable of resisting the corrosive gases, acids, bacteria and other corrosive materials or corrosion causing materials within the sewer system is applied to and bonded with the interior facing surface 32 of the sustratum 28. The thermoplastic liner layer 34 can be a polyvinyl chloride layer 34 in which the surface of the polyvinyl chloride which is applied to the interior facing surface 32 is prepared for bonding with the urethane foam by applying a clear moisture-cured polyurethane primer-activator.

The thermoplastic layer 34 could be a polyethylene. Polyethylene can be prepared for bonding with the interior facing surface 32 by roughening or ionizing of the surface to be bonded with a gas flame of propane or methylacetylene propane. The bonding surface may be roughened by a discharge of electrical energy through the polyethylene layer in the corona spectrum.

If the layer 34 is to be overlapped at longitudinal edges so as to form a lap seam, both sides of the layer along the seam should be treated. In the normal application of polyethylene, the corona discharge ionization will effectively prepare both sides of the polyethylene simultaneously.

Both polyvinyl chloride and polyethylene layers 34 are known to be substantially free of pin holes and "blow holes," results that frequently exacerbate into sewer pipe deterioration in time.

An alternative embodiment comprises the use of a foamed epoxy as the substratum 28. The epoxy resin is formulated using a flexible resin material containing capped diols or cercaptans for flexibility, and an isocyanate for thixotropy. A suitable surfactant is added to control cell size and structure. It is believed that for optimum restoration, the cell structure should be comprised mostly of closed cells of small size. The amine is hydrogenated in such an amount to result in a density of the formed epoxy of from ten to fifty-five pounds per cubic foot. The precise amount of water is determined according to the strength desired in the conduit to be restored, and costs associated with the restoration.

Another alternative embodiment uses a hydrogenated resin comprised of a polyurethane resin and an epoxy resin for use in making the substratum. A polyurethane resin is blended with an epoxy resin and an isocyanate. The polyurethane resin is a capped diol which prevents premature curing of the urethane resin by the isocyanate. Epoxy chemistry provides a suitable curing agent. Best results are obtained with a cycloaliphatic amine. Thixotropic and surfactant components may be added as described hereinabove for single resins.

Figure 3:
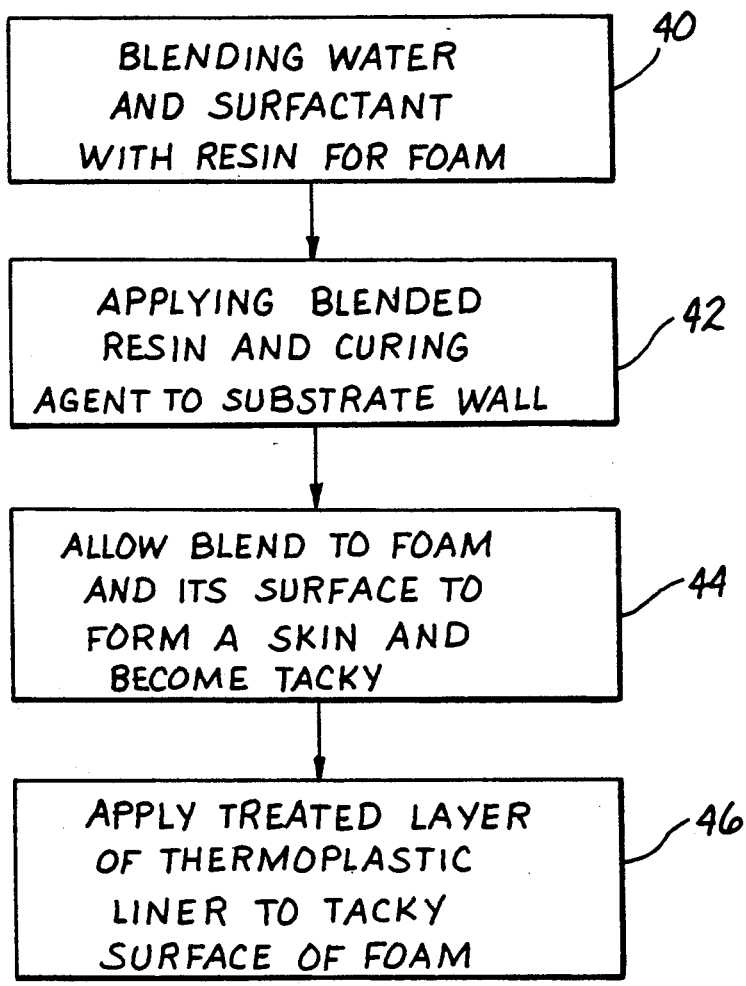

A method used for applying the foam includes the initial step of blending the polyurethane resin components, reference being had to FIG. 3 of the accompanying drawings. In the initial step, the surfactant and amine are blended with the resin in the presence of a catalyst, such as dibutyltindilaureate in a container having blending blades rotated at 1750 rpm for two hours or more. The curing agent is formed by prepolymerizing a quantity of the resin with the isocyanate to balance the volumetric ratio of resin and curing agent to a ratio of approximately 1:1. To prepolymerize, the components are blended with a mixer blade rotating at a speed of 450 rpm for approximately two hours.

The blended resin and the curing agent are transmitted through separate conduits to a nozzle at the location of application on the deteriorated wall 18 of the conduit 14 requiring restoration. The resin and curing agent interact to form a closed cell plastic foam. In approximately one-half hour, the foam has set to the point where the interior facing surface appears as a skin which is tacky to the touch.

A pre-treated extruded thermoplastic sheet liner, such as polyvinyl chloride or polyethylene has one of its surfaces prepared for bonding to the foam. Polyvinyl chloride is treated by applying a clear moisture-cured primer-activator. The polyethylene is treated by a discharge of electrical energy through the polyethylene layer in the corona spectrum. The sheet liner layer is applied to the tacky surface of the foam. The liner layer is rolled or otherwise pressed to minimize air entrapment between the liner layer and foam.

It may be seen that there is provided a method of restoring corroded and deteriorated concrete and metal structures, such as sewer conduits which provides strength and protection to the interior surfaces of the structures. The method describes a novel substratum, as well. It may be appreciated that such a method and substratum will provide some strength and protection at even slight densities of the foam. Further, it may be appreciated that the foam beneath the thermoplastic liner layer will provide a superior lining and coating arrangement, even for those structure which have not corroded, such as new installations.

The foregoing description of my invention and of preferred embodiments as to products, compositions and processes is illustrative of specific embodiments only. It is to be understood, however, that additional embodiments may be perceived by those skilled in the art. The embodiments described herein, together with those additional embodiments, are considered to be within the scope of the present invention, which is to be defined only by the appended claims.

I claim:

1. A method for restoring a concrete structure susceptible to deterioration by contact with corroding agents wherein portions of said structure are removed as a result of said deterioration to create void spaces where said structure existed, comprising the steps of:
   a. hydrogenating a resin selected from the group consisting of polyurethane resin, epoxy resin and combinations thereof;
   b. applying the hydrogenated resin along with a curing agent into the void spaces created by said removed portions of the structure;
   c. allowing the resin and the curing agent to form a foam to a density of at least ten pounds per cubic foot, and to set, to form a foam resulting in an interior facing surface until said surface forms a skin tacky to touch;
   d. preparing a surface of a layer of extruded thermoplastic liner for bonding said liner with said interior facing surfaces of said foam; and,
   e. applying said prepared surface of a layer of extruded thermoplastic liner to the interior facing surface of said foam, having the prepared liner surface adjacent said foam to bond said thermoplastic liner to said foam.

2. The method of claim 1 wherein said resin comprises a polyurethane resin and said curing agent comprises an isocyanate.

3. The method of claim 2 further comprising the step of blending said resin with cycloaliphatic amine prior to said applying step.

4. The method of claim 1 wherein said layer of extruded thermoplastic liner comprises polyvinyl chloride.

5. The method of claim 1 wherein said layer of extruded thermoplastic liner comprises polyethylene.

6. The method of claim 1 wherein said resin comprises an epoxy resin and said curing agent comprises an amine.

7. The method of claim 6 further comprising the step of blending said epoxy resin with isocyanate prior to said applying step.

8. The method of claim 1 wherein said resin comprises a blend of polyurethane resin and epoxy resin, and further comprising the step of blending said polyurethane resin and said epoxy resin prior to said applying step.

9. The method of claim 8 wherein said blending step, isocyanate is blended with said polyurethane resin and said epoxy resin.

10. The method of claim 8 wherein said curing agent is amine.

11. The method of claim 1 wherein said density of said foam is in the range of from ten to fifty-five pounds per cubic foot.

12. A substratum formed by the method of claim 1.

13. A surface substratum for lining and restoring a concrete structure susceptible to deterioration by contact with corroding agents and susceptible to having portions of said structure removed as a result of said deterioration to create void spaces where said structure existed, comprising:

a. a foam selected from the group consisting of polyurethane foam, epoxy foam and combinations thereof, adapted to be applied into said void spaces to result in a restored structure having an interior facing surfaces; and, b. a layer of an extruded thermoplastic liner bonded to said interior facing surface of said foam.

14. The surface substratum of claim 13 wherein said foam comprises a polyurethane foam.

15. The surface substratum of claim 14 further comprising cycloaliphatic amine blended with said polyurethane.

16. The surface substratum of claim 13 wherein said layer of extruded thermoplastic liner comprises polyvinyl chloride.

17. The surface substratum of claim 13 wherein said layer of extruded thermoplastic liner comprises polyethylene.

18. The surface substratum of claim 13 wherein said foam comprises an epoxy foam.

19. The surface substratum of claim 18 further comprising isocyanate blended with said epoxy foam.

20. The surface substratum of claim 13 wherein said foam comprises a blend of polyurethane foam and epoxy foam.

21. The surface substratum of claim 20 further comprising isocyanate blended with said polyurethane foam and said epoxy foam.

22. The surface substratum of claim 13 wherein said density of said foam is in the range of from ten to fifty-five pounds per cubic foot.

* * * * *